United States Patent
Gowrinathan

[19]
[11] Patent Number: 6,158,694
[45] Date of Patent: Dec. 12, 2000

[54] SPACECRAFT INERTIAL ATTITUDE AND RATE SENSOR CONTROL SYSTEM

[75] Inventor: Sankaran Gowrinathan, Manhattan Beach, Calif.

[73] Assignee: Raytheon Company, Lexington, Mass.

[21] Appl. No.: 09/170,986

[22] Filed: Oct. 13, 1998

[51] Int. Cl.$^7$ ........................................................ B64G 1/36

[52] U.S. Cl. ...................... 244/171; 244/3.16; 250/203.1; 250/332; 701/222; 702/150

[58] Field of Search .................. 244/3.16, 17, 158 R; 250/203.1, 372, 342, 208.1; 355/28.5; 348/208; 702/150; 107/222, 226

[56] References Cited

U.S. PATENT DOCUMENTS

| | | | |
|---|---|---|---|
| 3,658,427 | 4/1972 | Decou ..................................... | 244/3.16 |
| 3,744,740 | 7/1973 | Godin et al. ............................ | 244/3.19 |
| 5,131,611 | 7/1992 | Vollaro ................................. | 244/158 R |
| 5,367,371 | 11/1994 | Krawezyk .............................. | 356/28.5 |
| 5,546,309 | 8/1996 | Johnson et al. .......................... | 244/171 |
| 5,654,549 | 8/1997 | Landecker et al. ...................... | 250/332 |
| 5,687,933 | 11/1997 | Goodzeit et al. ........................ | 244/171 |

*Primary Examiner*—Galen L. Barefoot
*Attorney, Agent, or Firm*—William C. Schubert; Glenn H. Lenzen, Jr.

[57] ABSTRACT

Disclosed is a method and apparatus (1'; 1") for tracking a stellar body (22) using a telescope (9; 32) of a spacecraft (e.g., a satellite) (10; 10"). In accordance with an embodiment of the invention, the telescope (9; 32) is provided with gimbal supports (18a; 18b), and is maneuverable relative to the spacecraft (10; 10'). The stellar body (22) is acquired by the telescope (9; 32) so that the stellar body (22) is within the field of view (FOV) of the telescope (9; 32). After the stellar body (22) is acquired, an operation is performed for controlling the attitude of the spacecraft (10; 10') to within pre-established deadband limits, and, as a result, the spacecraft (10; 10') and telescope (9; 32) are each assumed to have a desired orientation relative to the stellar body (22). The stellar body tracking method of the invention is performed so as to maintain the telescope (9; 32) in an orientation wherein the stellar body (22) is within the field of view (FOV) of the telescope (9; 32), even if it occurs that one or more environmental disturbance forces impinge on the spacecraft (10; 10') and cause an undesired variation in the orientation of the spacecraft (10; 10') relative to the stellar body (22). The stellar body tracking method of the invention controllably points a pointing direction (line of sight) of the stellar body tracking system (1'; 1") independently of the spacecraft (10; 10'), for tracking the stellar body (22). In accordance with an aspect of this invention, spacecraft inertial position and rate information is derived for use in controlling the attitude of the spacecraft (10; 10'). In accordance with an embodiment of the invention, the pointing direction of the telescope (9; 32) is controllably pointed by maneuvering at least one of the telescope (9; 32) and a mirror (13") of the telescope (9; 32).

12 Claims, 7 Drawing Sheets

FIG.7 ated rate of the undesired motion of the spacecraft. Moreover, the invention may enable
SPACECRAFT INERTIAL ATTITUDE AND RATE SENSOR CONTROL SYSTEM

FIELD OF THE INVENTION

This invention relates generally to spacecraft attitude measurement systems and, in particular, to a spacecraft inertial attitude and rate sensor control system.

BACKGROUND OF THE INVENTION

While a spacecraft is in an orbit, the spacecraft may be subject to various external disturbance forces which can produce a moment about the spacecraft's center of mass, causing the spacecraft's attitude to change. This change in the spacecraft's attitude is undesirable in that it can result in the spacecraft's payload not being correctly oriented to a selected location. As such, conventional spacecraft often include attitude control systems which enable the attitude of the spacecraft to be controlled within pre-established deadband limits. Such attitude control systems often operate by employing conventional mechanisms such as, e.g., gyros (e.g., laser gyros) and/or conventional star trackers, to enable spacecraft attitude-related information to be detected for use in controlling the spacecraft's attitude.

The use of such conventional mechanisms for detecting spacecraft attitude-related information has a number of associated drawbacks. By example, conventional gyros that are employed for detecting spacecraft inertial rate information are often expensive. Also, in conventional star trackers, which typically employ a large field of view (e.g., 8°×8°) telescope having a Charge Coupled Device (CCD), the CCDs and the electronic circuits (e.g., such as those needed for providing clock drive signals and video signal processing) associated with the CCDs tend to be expensive, and the electronic circuits are often complex. Moreover, the performance of such components can become degraded if the components are exposed to solar radiation (the radiation hardness of a typical CCD is limited), and thus appropriate shielding must often be provided for protecting the components from exposure to solar radiation.

In view of these considerations, it can be appreciated that it would be desirable to provide a novel and inexpensive apparatus and technique for enabling spacecraft attitude-related information to be detected, for subsequent use in controlling the spacecraft's attitude, and which overcomes the above-described drawbacks associated with the prior art.

OBJECTS AND ADVANTAGES OF THE INVENTION

It is a first object and advantage of this invention to provide an improved apparatus and technique for providing spacecraft inertial position information, for subsequent use in controlling the attitude of the spacecraft.

It is a second object and advantage of this invention to provide an improved apparatus and technique for providing spacecraft inertial rate information, for subsequent use in controlling the attitude of the spacecraft.

It is a further object and advantage of this invention to provide a gimballed telescope for a spacecraft, and a technique for controlling the position of the telescope for enabling the telescope to track a predetermined stellar body.

SUMMARY OF THE INVENTION

The foregoing and other problems are overcome and the objects of the invention are realized by a method and apparatus for tracking a stellar body using a telescope of a spacecraft, in accordance with this invention. In accordance with the invention, the telescope is provided with gimbal supports, and may be maneuvered (i.e., rotated about at least two axes) relative to the spacecraft.

It is assumed that the stellar body is acquired by the telescope (the stellar body is within the field of view of the telescope), and that subsequently an operation is performed for controlling the attitude of the spacecraft to within pre-established deadband limits. As a result of this operation, the spacecraft and telescope are each assumed to have a desired orientation relative to the stellar body.

The stellar body tracking method of the invention controls the position of the telescope to enable the telescope to maintain an orientation wherein a desired stellar body is within the field of view of the telescope, even if it occurs that one or more environmental (e.g., solar) forces impinge on the spacecraft and cause an undesired variation in the orientation of the spacecraft relative to the stellar body. The stellar body tracking method in accordance with this invention comprises steps of a) detecting an undesired motion of the spacecraft which alters the orientation of the spacecraft relative to the stellar body; and b) maneuvering the telescope during the undesired motion of the spacecraft so that the telescope is maintained in an orientation wherein the stellar body is within the field of view of the telescope. The maneuvering step controllably points a pointing direction (line of sight) of the telescope independently of the spacecraft, for enabling the stellar body to be tracked.

In accordance with another aspect of this invention, spacecraft inertial position and rate information is derived for use in controlling the attitude of the spacecraft. By example, in accordance with this aspect of the invention steps are performed of detecting a rate of motion of the telescope about at least one axis during the maneuvering of the telescope, detecting a position of the telescope during the maneuvering of the telescope, and determining at least one of a position of the spacecraft and a rate of the undesired motion of the spacecraft, based on the detected position of the telescope and the detected rate of movement of the telescope about the at least one axis.

Further in accordance with this invention, a step is performed of providing at least one torque to the spacecraft for controlling the attitude of the spacecraft within pre-established deadband limits, based on the determined position of the spacecraft and the determined rate of the undesired motion of the spacecraft.

In accordance with another embodiment of the invention, the telescope is rotatable about a single axis, and includes a rotatable mirror that may also be maneuvered during the undesired motion of the spacecraft for maintaining the stellar body within the field of view of the telescope.

BRIEF DESCRIPTION OF THE DRAWINGS

The above set forth and other features of the invention are made more apparent in the ensuing Detailed Description of the Invention when read in conjunction with the attached Drawings, wherein:

FIG. 2c shows a representation of telescope inertial position values interpolated by a controller of the SIARSCS of FIG. 1, superimposed over the exemplary values of FIG. 2a.

Identically labeled elements appearing in different ones of the figures refer to the same elements but may not be referenced in the description for all figures.

DETAILED DESCRIPTION OF THE INVENTION

Figure 1:
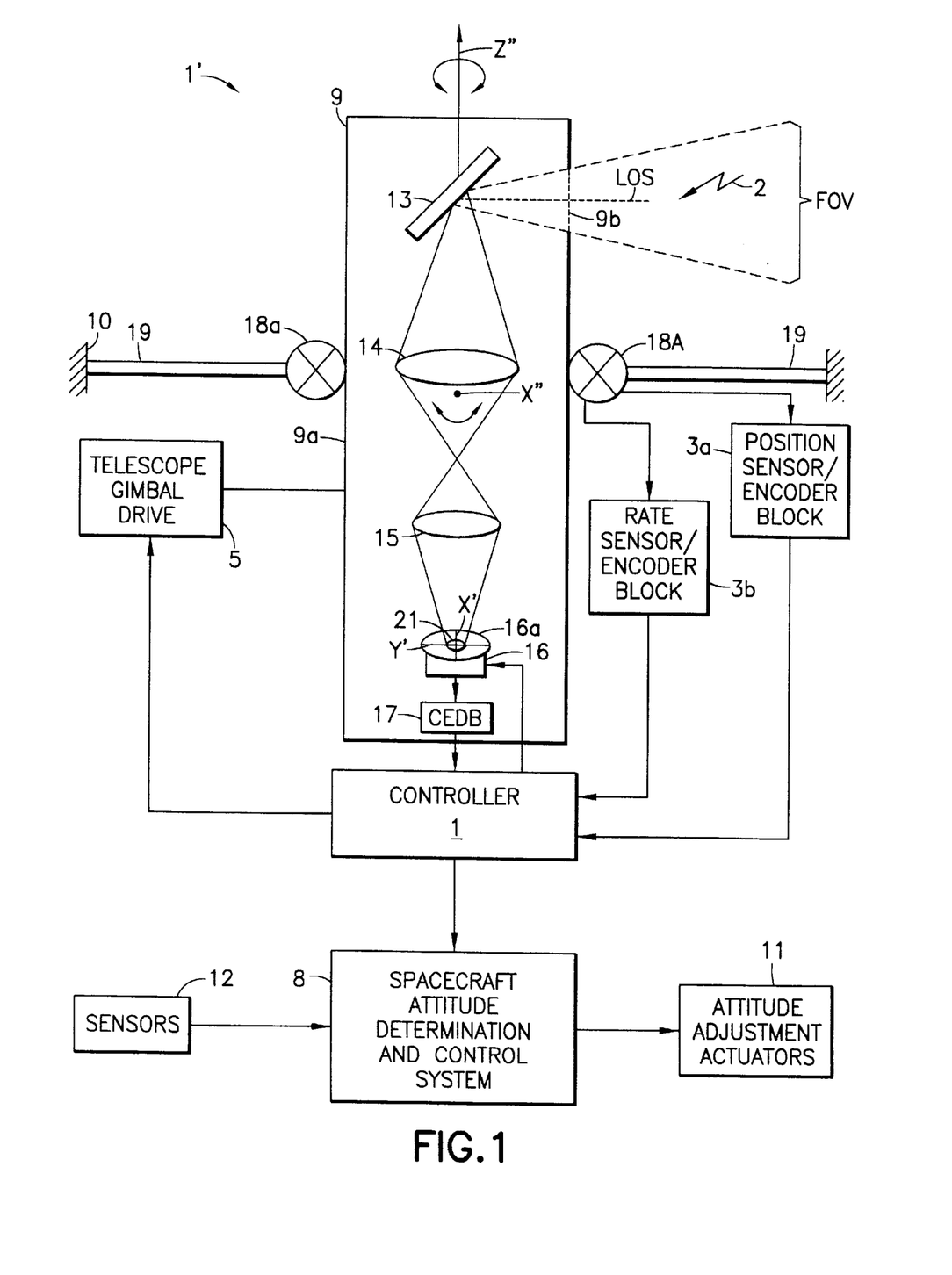
FIG. 1 depicts a Spacecraft Inertial Attitude and Rate Sensor Control System (SIARSCS) that is constructed in accordance with an embodiment of this invention, wherein a gimballed telescope of the SIARSCS is represented in a perspective view.

FIG. 1 illustrates a block diagram of a Spacecraft Inertial Attitude and Rate Sensor Control System (SIARSCS) 1' that is constructed in accordance with an embodiment of this invention. The SIARSCS 1' comprises a telescope 9, a telescope drive mechanism (also referred to as a telescope drive) 5, a position sensor/encoder block 3a, a rate sensor/encoder block 3b, a controller 1, a spacecraft attitude determination and control system (SADACS) 8, and attitude adjustment actuators 11, which may include, for example, thrusters, momentum wheels, and/or magnetic torquers. Sensors 12, which may include, for example, gyros, an earth sensor, and/or a sun sensor, may also be provided for taking measurements that are used in providing attitude control, although it is not necessary that these elements be employed, as will be described below.

Bearings 18a are disposed between a surface 9a of the telescope 9 and a structural portion 19 of a spacecraft 10, and provide gimbal supports for the telescope 9 to allow the telescope 9 to be rotated about axes x" and z". The telescope drive mechanism 5 is drivably-engaged with the surface 9a of the telescope 9. The telescope drive mechanism 5 is controllable by the controller 1 for being actuated to provide selected torques to the telescope 9 for causing the telescope 9 to rotate about one or more of the axes x" and z" by selected angular displacements relative to the spacecraft structure 19. Preferably, the telescope drive mechanism 5 and the bearings 18a have a collective capability for enabling the telescope 9 to be rotated about the axis z" by at least 50 degrees and about the x" axis by at least ±4 degrees, thereby allowing the telescope 9 to scan over ±4 degrees in elevation (±8 degrees line of sight) and over ±50 degrees in azimuth. Also, in a preferred embodiment of this invention, the telescope 9 has a field of view (FOV) of about ±0.5 degrees.

It should be noted that any suitable type of drive mechanism may be employed for the telescope drive 5, including, by example, an electro-mechanical or inertial drive mechanism.

In the preferred embodiment of the invention, the telescope 9 comprises a mirror 13, a primary lens 14, a secondary lens 15, a quad cell detector (also referred to as a quad cell or light-sensitive optic) 16, and a centroid error detection block (CEDB) 17, which operates in a manner as will be described below. Wavelengths 2 (such as those emitted by a stellar body within the field of view (FOV) of telescope 9) received by the telescope 9 through an aperture 9b of the telescope 9 are reflected from the mirror 13 to the primary lens 14, which then focusses the wavelengths it receives to the secondary lens 15. Those ones of the wavelengths that are reflected to the secondary lens 15 are focussed by the secondary lens 15 to a radiation sensitive surface 16a of the quad cell 16. A representation of star light energy 21 incident on the surface 16a of the quad cell 16 is shown in FIG. 1.

The quad cell 16 is responsive to the star light energy 21 incident on the surface 16a of the quad cell 16 for producing signals corresponding to the star light energy 21. The quad cell 16 is controllable by the controller 1 for reading out these signals to the CEDB 17. Based on signals received by the CEDB 17 from the quad cell 16, the CEDB 17 computes the centroid of the distribution of star light energy 21 on the quad cell surface 16a. The CEDB 17 also calculates the position and offset of the centroid relative to an x'–y' coordinate system defined by the quad cell 16, and outputs information to the controller 1 representing the calculated position and offset of the centroid relative to the x'–y' coordinate system, as will be further described below.

It should be noted that any suitable known type of small area detector for maintaining fine lock may be employed for the quad cell 16, including, by example, a small area CCD device. Preferably, the quad cell 16 has a field of view of ±0.5 mrad. Also, any suitable type of device/circuit and technique may be employed for computing, based on the quad cell outputs, the centroid of distribution of star light energy 21 on the quad cell surface 16a and the position and offset of the centroid relative to the coordinate system defined by the quad cell 16. Moreover, it is within the scope of this invention to employ other types of detector arrays besides quad cell detectors, so long as a position of an energy distribution incident on a radiation sensitive surface of the detector array can be determined relative to predetermined reference coordinates/axes.

The position sensor/encoder block 3a and the rate sensor/encoder block 3b will now be described. The position sensor/encoder block 3a (which may include, for example, one or more shaft position indicators and encoders) detects the angular position (i.e., the arc of rotation) of the telescope 9 relative to individual ones of the axes z" and x", and translates the detected angular position to corresponding information (e.g., a series of digital pulses) which represents the detected angular position of the telescope 9. This information is provided to the controller 1, which employs the information in a manner as will be described below.

For cases where the telescope 9 is rotated about one or more of the axes x" and z" (as will be described below), the rate sensor/encoder block 3b detects the angular velocity of the telescope's rotation about these axes x" and/or z", and translates the detected angular velocity about each axis z" and x" to corresponding information (e.g., a series of digital pulses). The information, which represents the detected angular velocity of the telescope 9 about the individual axes z" and x" is output by the rate sensor/encoder block 3b to the controller 1, wherein it is employed in a manner as will be described below. It should be noted that it is within the scope of this invention to calculate within the controller 1 the angular velocity of the telescope 9 about each individual axis z" and x" based on outputs of the position sensor/encoder block 3a, and thus, in an alternate embodiment of the invention a separate rate sensor/encoder block 3b need not be employed.

The spacecraft attitude determination and control system (SADACS) 8 is assumed to have a capability for controlling the attitude of the spacecraft 10 for maintaining the attitude of the spacecraft 10 within pre-established deadband limits, based on measurements made by the blocks 3a and 3b and/or the sensors 12. In accordance with an aspect of the invention, however, and as was previously mentioned, the sensors 12 need not be employed for providing such measurements, and the spacecraft attitude may be controlled based solely on measurements made by the blocks 3a and 3b. This aspect of the invention will be further explained below.

The technique employed by the SADACS 8 for controlling the attitude of the spacecraft 10 may be any suitable type of technique for providing spacecraft attitude control. By example, reference may be had to U.S. Pat. No. 5,348,255, issued Sep. 20, 1994, entitled System and Method for Sensing Attitude of a Spacecraft with Equilized Star Tracker Errors Along Three Orthogonal Axes, by Rene Abreu, wherein an attitude control processor is described which may be one suitable embodiment of the SADACS 8. The SADACS 8 controls the spacecraft attitude by activating selected ones of the spacecraft attitude adjustment actuators 11, such as thrusters, to provide appropriate roll, pitch, and/or yaw torques for controlling the spacecraft attitude.

Before describing the method of the invention in detail, some preliminary considerations will first be made. For the purposes of the following description, it is assumed that the location of the telescope 9 on the spacecraft 10 is such that the axis z" (FIG. 1) passing through the telescope 9 is the same as axis z (yaw) represented in FIGS. 3a–3c, which show various orientations of the spacecraft (e.g., a satellite) 10, telescope 9, and the field of view (FOV) and line of sight (LOS) (also referred to as a pointing direction) of the telescope 9, relative to a stellar body (e.g., assumed to be a star) 22, from a perspective looking down on these elements 10, 9, FOV, LOS, and 22. Preferably, the spacecraft 10 is in a low earth orbit (LEO), although other orbital configurations may be employed.

Figure 3A:
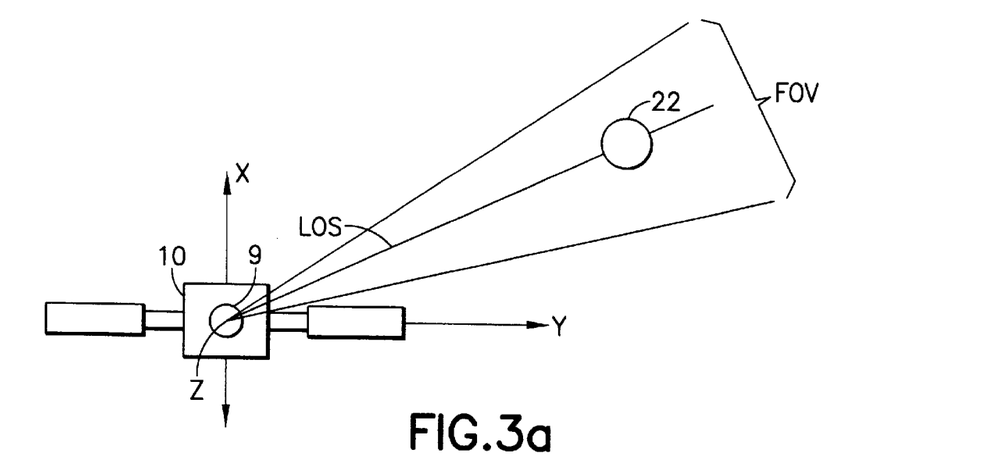
FIG. 3a–3c show various orientations of a spacecraft and the telescope of FIG. 1 relative to a stellar body, as viewed from a perspective looking down on the spacecraft, the telescope, and the stellar body.

FIG. 3a is an exemplary representation of the spacecraft 10 and the star 22 at a first instance in time. It is assumed that at this time, the star 22 (e.g., which may have a brightness of approximately 5 Mv) is acquired by the spacecraft telescope 9. The technique employed by the spacecraft 10 for acquiring the star 22 may be any suitable known type of stellar body acquisition technique. For example, the acquisition technique may employ information from a star catalog in an 8 degree×10 degree Field of Regard of the gimballed telescope 9. Preferably, two focal planes are employed for reducing acquisition time. For example, in one embodiment one of the focal planes is provided by employing sixteen course acquisition detectors (a large field of view) in the telescope 9, and the other focal plane is provided by the quad cell 16, which provides fine lock tracking.

It is also assumed that after the star 22 is acquired, the spacecraft attitude determination and control system 8 operates to control the attitude of the spacecraft 10 so as cause the spacecraft attitude to be within pre-established deadband limits.

Figure 4A:
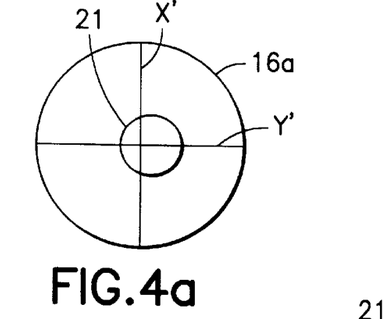
FIGS. 4a–4c show a radiation sensitive surface 16a of a quad cell detector of the telescope of FIG. 1a, and also shows a representation of star light energy 21 incident on the surface 16a of the quad cell for the various orientations of the spacecraft and telescope depicted in FIGS. 3a–3c, respectively.

The orientation of the spacecraft 10, telescope 9, and the telescope FOV and LOS relative to the star 22, as depicted in FIG. 3a, is assumed to be a desired orientation for the spacecraft 10, telescope 9, FOV and LOS relative to the star 22. As is represented in FIG. 3a, the star 22 is assumed to be located within the field of view (FOV) and line of sight (LOS) of the telescope 9. Also, it is assumed that while the spacecraft 10, telescope 9, FOV, and LOS are oriented relative to the star 22 in the manner shown in FIG. 3a, a centroid of a distribution of star light energy 21 (resulting from light received by telescope 9 from star 22) incident on the quad cell surface 16a is located at an intersection of axes x' and y' defined by the quad cell 16, as is represented in FIG. 4a. This is assumed to be an expected position of the centroid of the star light energy 21 on the quad cell 16. For the purposes of this description, this expected position of the centroid of the star light energy 21 (i.e., the intersection of axes x' and y') is hereinafter also referred to as a line of sight reference point.

As was previously described, while a spacecraft, such as the spacecraft 10, is in an orbit, various forces (e.g., solar forces and/or other environmental forces) may impinge on the spacecraft 10 and cause a change in the attitude of the spacecraft 10. As can be appreciated, and assuming that the telescope drive 5 is not activated so that the telescope 9 is stabilized, a change in the attitude of the spacecraft 10 also can cause a change in the orientation of the telescope 9 and the telescope's field of view (FOV) and line of sight (LOS) relative to the star 22. This can cause the centroid of the star light energy distribution 21 on the quad cell surface 16a to "drift" (i.e., displace) away from the line of sight reference point by a displacement corresponding to the amount of displacement of the telescope 9 (LOS, and FOV) from the position shown in FIG. 3a. In accordance with an aspect of this invention, the SIARSCS 1' operates as a closed loop control system for performing a fine tracking technique to maintain the centroid of the distribution of star light energy 21 substantially at the line of sight reference point defined by quad cell 16. Also, the technique of the invention enables the spacecraft's inertial rate and position to be estimated so that the attitude of the spacecraft can be controlled based on these estimates. The manner in which the SIARSCS 1' operates will now be described in detail.

Figure 3B:
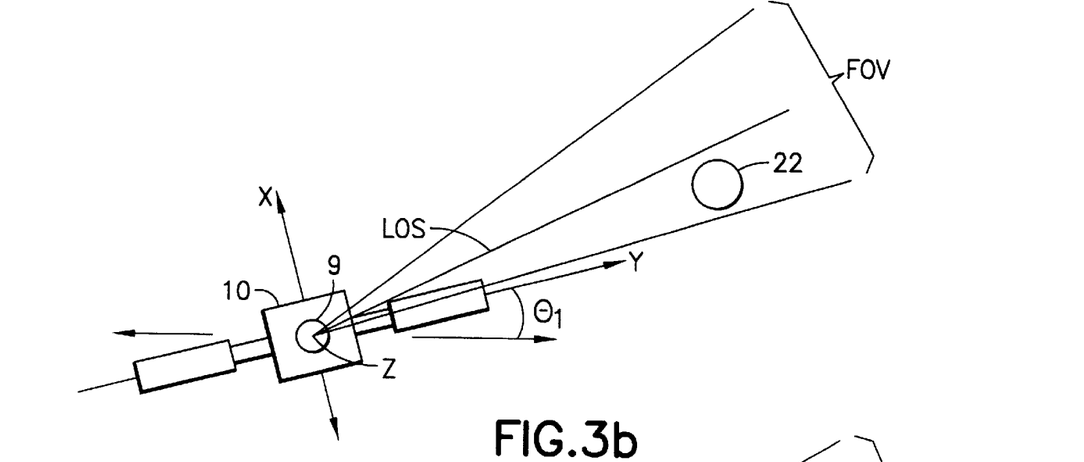
Figure 5A:
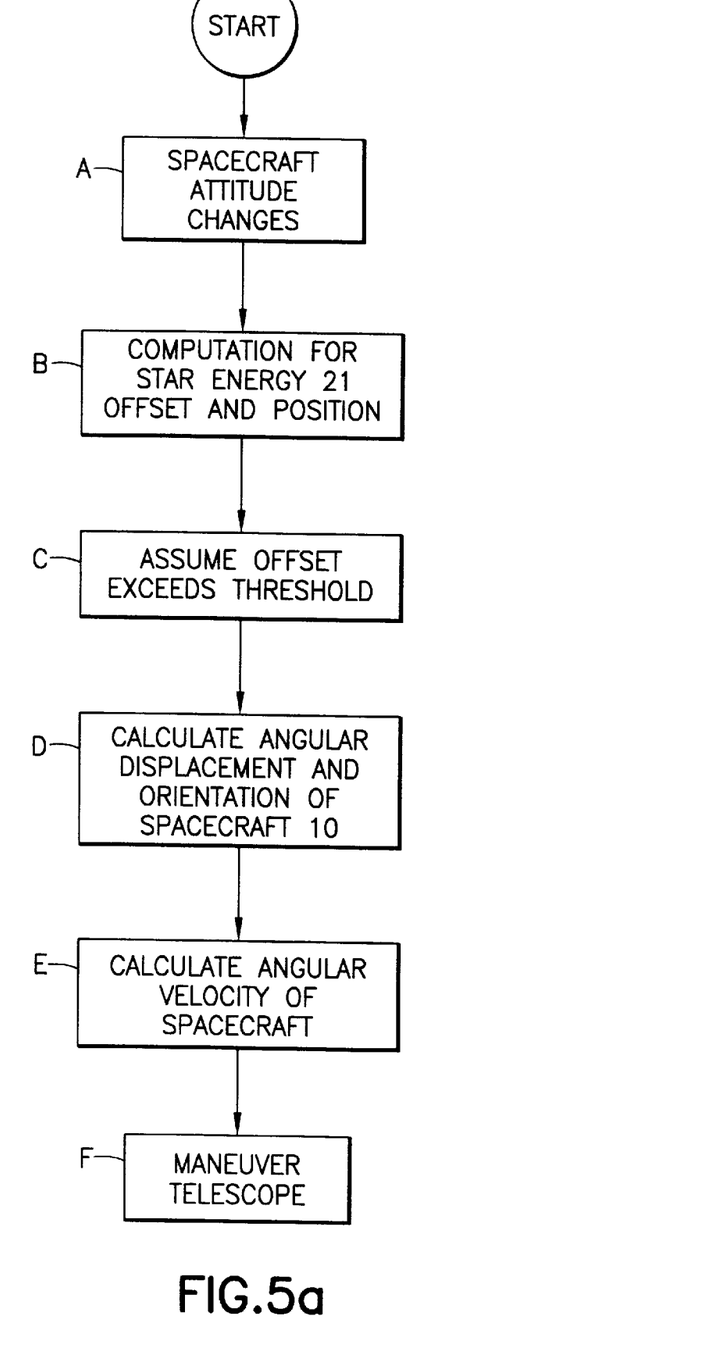
FIGS. 5a and 5b depict a method in accordance with this invention for controlling the position of the telescope of FIG. 1.

It is assumed that, as a result of, e.g., solar and/or other environmental forces impinging on the spacecraft 10, the spacecraft 10 is caused to yaw at a constant angular velocity such that the orientation (attitude) of the spacecraft 10, and hence, the orientation of the telescope 9, LOS, and FOV, relative to the star 22, varies accordingly. This occurrence is also represented by block (A) of the flow diagram of FIG. 5a. A representation of the orientation of elements 9, 10, LOS, and FOV relative to star 22 at a second instance in time that occurs during the spacecraft yaw rotation is shown in FIG. 3b. As can be seen in FIG. 3b, at this second instance of time, the spacecraft 10 has been displaced about axis z by an angle of $(\theta_1)$.

Figure 4B:
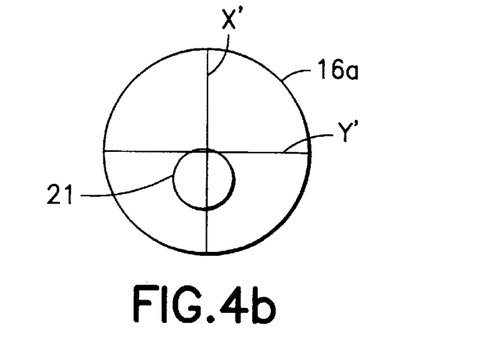
Figure 4C:
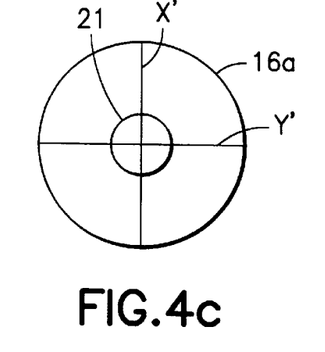

It is also assumed that, as a result of the change in the attitude of the spacecraft 9, and the corresponding change in the orientation of the telescope 9, LOS, and FOV relative to the star 22, the centroid of the distribution of star light energy 21 on the quad cell surface 16a is displaced from the line of sight reference point by an angular displacement corresponding to the spacecraft's angular displacement ($\theta_1$). By example, a representation of the location of the star light energy distribution 21 on the quad cell surface 16a at the second instance of time is represented in FIG. 4b. The amount of displacement of the star light energy distribution 21 from the line of sight reference point is corresponds to the angle ($\theta_1$) of displacement of the spacecraft 10. For the purposes of this description, this displacement of the star light energy distribution 21 from the line of sight reference point is assumed to be a maximum acceptable displacement of the star light energy distribution 21 from the line of sight reference point.

Assuming that the quad cell 16 is controlled by the controller 1 for reading out signals corresponding to the star light energy 21 incident on the quad cell surface 16a at the second instance of time, and that, as a result, the signals are forwarded from the quad cell 16 to the CEDB 17, the CEDB 17 computes the centroid of the distribution of star light energy 21 on the quad cell surface 16a, and calculates the position of the centroid on the quad cell surface 16a relative to the line of site reference point of the x'-y' coordinate system defined by the quad cell 16. Also, based on the signals output by the quad cell 16, the CEDB 17 performs a computation to determine the amount of offset (e.g., the angular displacement) between the location of the centroid of star light energy distribution 21 on the quad cell surface 16a and the line of sight reference point (i.e., the intersection of axes x' and y' of quad cell 16). These computations are collectively represented by block (B) of FIG. 5a, and may be performed using conventional techniques. As was previously described, the amount of offset (e.g., angular displacement) between the location of the centroid of star light energy 21 on the quad cell surface 16a and the line of sight reference point of the quad cell 16 corresponds to the angular displacement ($\theta_1$) of the spacecraft 10.

Figure 8:
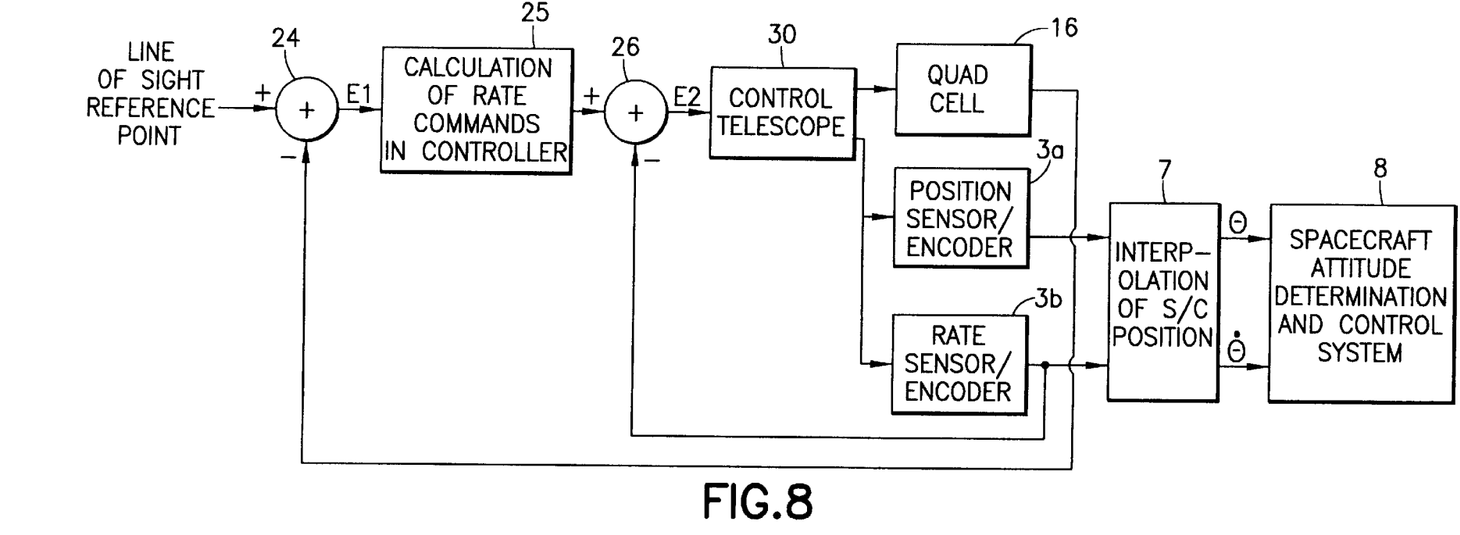
FIG. 8 illustrates a closed-loop control system for controlling the position of the telescope of FIG. 1 in accordance with this invention.

Information representing the determined position of the centroid of star light energy distribution 21 on the quad cell surface 16a and the offset of this distribution 21 relative to the line of sight reference point is output from the CEDB 17 to the controller 1. For the purposes of this description, this information is referred to as an error signal (e1), which is represented in FIG. 8. Also, block 24 of FIG. 8 represents the computations performed by the CEDB 17 described above.

Within the controller 1, based on the portion of error signal (e1) representing the determined offset of the centroid of star light energy 21 relative to the line of sight reference point, a determination is made of whether the determined offset is equal to or exceeds a predetermined threshold. Preferably, the predetermined threshold is one that allows the orientation of the telescope 9, LOS, and FOV relative to the star 22 to change at least somewhat from the desired attitude of these elements, and there is an error margin between the predetermined threshold and an offset where the orientation of the telescope 9 and FOV relative to star 22 would be such that the star 22 would be outside of the FOV of the telescope 9.

For the purposes of this description, it is assumed that based on the error signal (e1) representing the position and offset of the centroid of star light energy distribution 21 on the quad cell surface 16a relative to the line of sight reference point at the second instance of time, the controller 1 determines that the determined offset does not equal or exceed the predetermined threshold. As such, no controlling of the telescope 9 is necessary in this case.

Figure 3C:
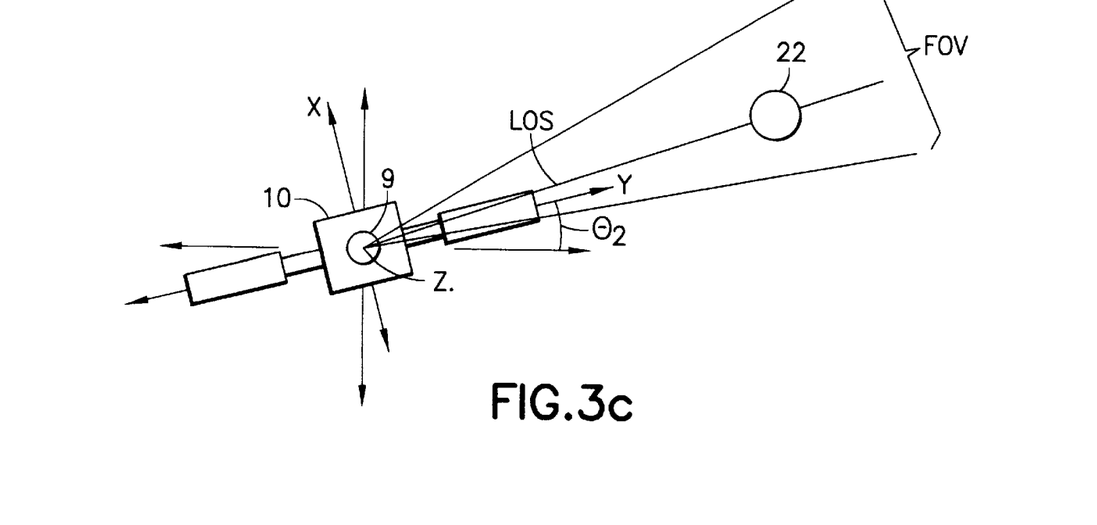

A determination that the determined offset is equal to or greater than the predetermined threshold indicates that the spacecraft attitude has further varied from the desired spacecraft attitude, owing to, e.g., the environmental forces impinging on the spacecraft 10. For example, it is assumed for the purposes of this description that after the occurrence of the second instance of time, the spacecraft 10 continues to rotate about the yaw axis as a result of the environmental forces, and that, eventually, at a third instance of time, the spacecraft 10 reaches an angular displacement of ($\theta_2$) (about the yaw axis). This is represented in FIG. 3c. As can be appreciated, if the telescope 9 were stabilized during this continued rotation of the spacecraft 10, the orientation of the telescope (and the LOS and FOV) relative to the star 22 would continue to vary accordingly at the same angular velocity as that of the spacecraft 10. However, in accordance with this invention, the components 1 and 5 operate in conjunction with one another to maneuver the telescope 9 during the continued rotation of the spacecraft 10 so as to cause the telescope 9, LOS and FOV to maintain acceptable orientations relative to the star 22, as will now be described.

As was described above, it is assumed that at the third instance of time, the spacecraft 10 reaches an angular displacement of ($\theta_2$) (about the yaw axis). It is also assumed that at this instance of time the controller 1 controls the quad cell 16 so as to cause signals to be read out from the quad cell 16 to the CEDB 17, and that, as a result, the CEDB 17 outputs to the controller 1 an error signal (e1) representing the position and offset of the centroid of star light energy distribution 21 on the quad cell surface 16a relative to the line of sight reference point.

In response to receiving this error signal (e1), the controller 1 makes a determination of whether the offset represented by the signal (e1) is equal to or exceeds the assumed to correspond to the rate (i.e., angular velocity) at which the spacecraft 10 (and hence, the telescope 9) rotates about the z (yaw) axis as a result of the environmental force(s) impinging on the spacecraft 10.

After the controller 1 performs the calculations described above to determine the approximate amount of angular displacement of the spacecraft 10 about the yaw axis, to generate the angular torque command, and to determine the approximate orientation of the spacecraft 10 relative to the star 22, the controller 1 controls the telescope drive 5, based on the results of these calculations, so as to cause the telescope drive 5 to apply torque(s) to the telescope 9 for maneuvering (e.g., rotating) the telescope 9 (block F). In the example described herein, the controller 1 controls the telescope drive 5 so as to apply a torque to the telescope 9 for maneuvering the telescope 9 in an opposite direction than the direction of motion of the spacecraft 10 about the z axis (e.g., the telescope 9 is rotated in an opposite direction about axis z than the direction of rotation of the spacecraft) by a total angular displacement that is substantially equal to the total angular displacement ($\theta_2$) of the spacecraft 10. The torque is applied by the telescope drive 5 in such a manner that the telescope 9 is caused to rotate at an angular velocity that is substantially equal to the spacecraft angular velocity (the angular velocity of the telescope 9 is determined by the angular torque command determined previously at block E). That is, based on values of the spacecraft angular displacement, orientation relative to star 22, and angular torque command calculated previously by the controller 1 at blocks E and F, the controller 1 controls the telescope drive 5 so as to apply a torque to the telescope 9 for causing the telescope 9 to be rotated at an angular velocity that is substantially equal to the spacecraft angular velocity, and for causing the telescope 9 (and the telescope LOS and FOV) to have a corrected predetermined threshold. Assuming that the controller 1 determines that the offset does equal or exceed the predetermined threshold (block C of FIG. 5*a*), then the controller 1 performs further calculations. In particular, based on the error signal (e1) received from the CEDB 17, the controller 1 performs a calculation to make an approximate determination of the amount of angular displacement of the spacecraft 10 about each individual axis x, y, and z. In the example described herein, it is assumed that the spacecraft rotates about only the z (yaw) axis. Thus, in this example it is assumed that the calculation performed by the controller 1 results in an approximate determination of the spacecraft 10 displacement about this z axis. Also based on the error signal (e1) received from the CEDB 17, the controller 1 performs a calculation to make an approximate determination of the orientation of the spacecraft 10 relative to the star 22. These calculations performed by the controller 1 are collectively represented by block D of FIG. 5*a*.

Moreover, typically the controller 1 performs a further calculation to generate an angular torque command using the following equation (EQ1):

$$\text{angular torque command} = \frac{(1+T_1S)}{(1+T_2S)} \tag{EQ1}$$

wherein S represents a Laplace Transform that is assumed to employ the portion of error signal (e1) representing the offset between the centroid of star light energy distribution 21 and the line of sight reference point, $T_1$ represents a lead time constant, and $T_2$ represents a lag time constant. The calculation performed by the controller 1 for generating the angular torque command is represented by blocks 25 and (F) of FIGS. 8 and 5*a*, respectively. At least a portion of the generated angular torque command is orientation relative to the star 22 such that the centroid of the distribution of star light energy 21 on the quad cell surface 16*a* is again located at the line of sight reference point defined by the quad cell 16 (see, e.g., FIG. 4*c*). In this manner, the telescope 9, LOS and FOV are again oriented in their desired orientations relative to the star 22, regardless of the undesired rotation of the spacecraft 10. A representation of a corrected orientation of the telescope 9, LOS and FOV relative to star 22, at a time which is assumed to be the third instance of time, is depicted in FIG. 3*c*. The step of controlling the telescope 9 is represented by block 30 in FIG. 8, and, as can be appreciated in view of FIG. 8, the above operations for controlling the position of the telescope 9 are performed in a closed-loop manner based on outputs of the quad cell 16.

Figure 5B:
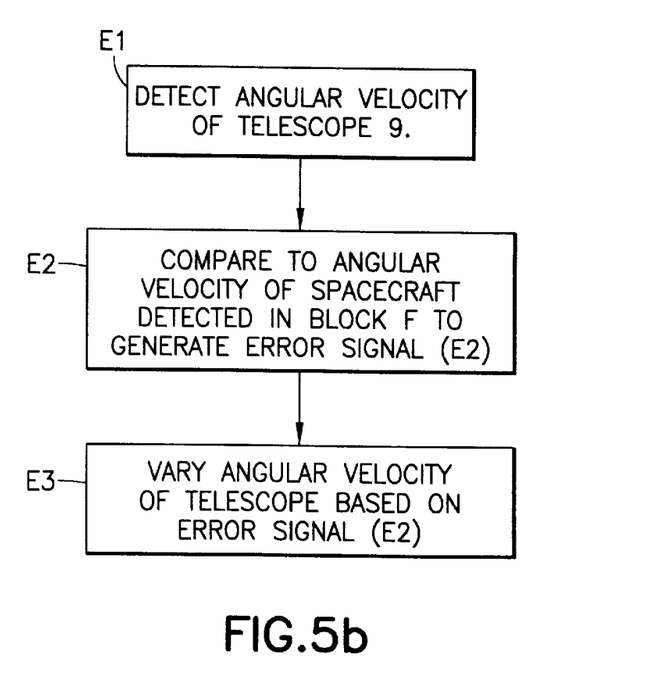

In accordance with an aspect of this invention, the SIAR-SCS 1' also operates as a closed-loop control system for providing further control of the angular velocity of the telescope 9 about the individual axes z" and x", to ensure that the angular velocity of the telescope 9 is similar in magnitude to that of the spacecraft 10 during the undesired motion of the spacecraft 10. By example, as the telescope 9 is being maneuvered in the above-described manner, the rate sensor/encoder block 3*b* detects the angular velocity of the telescope 9 about each individual axis x" and z", and outputs information representing the detected angular velocity about each individual axis x" and z" to the controller 1 (block E1 of FIG. 5*b*). In the example described above, the telescope 9 is rotated about axis z" only, so it is assumed that the information provided by the block 3*b* to the controller 1 represents the detected angular velocity of the telescope 9 about this axis z" only. Within the controller 1, the information representing the detected angular velocity of telescope 9 is compared to a value of the angular torque command representing the approximate angular velocity of the spacecraft 10 (calculated previously at block E) (block 26 of FIG. 8) For cases in which the value of the detected telescope angular velocity differs from the spacecraft angular velocity rate value represented by the angular torque command, an error signal (e2) (FIG. 8) is generated which is proportional to the difference between these values. This step is represented by block E2 of FIG. 5*b*. The controller 1 then employs the error signal (e2) to control the telescope drive 5 for causing the drive 5 vary the angular velocity of the telescope 9 by an amount that is substantially equivalent to the difference represented by the error signal (e2) (see, e.g., blocks F3 and 30 of FIGS. 5*b* and 8, respectively). In this manner, the difference between the calculated angular torque command (representing a calculated value of the spacecraft angular velocity) and the detected angular velocity is minimized so that the telescope 9 is rotated at substantially the same angular velocity as that of the spacecraft 10, for maintaining the telescope 9 in its desired orientation relative to star 22.

Another aspect of the invention will now be described. As was previously described, the position sensor/encoder block 3*a* detects the angular position of the telescope 9 relative to each axis z" and x" and provides corresponding information representing the detected angular position relative to each axis z" and x" to the controller 1. In a preferred embodiment of the invention, the position sensor/encoder block 3*a* has a capability for detecting angular displacements of the telescope 9 (about the individual axes z" and x") that are at least as small as 10 arc seconds, and provides an output representing the angular position of the telescope 9 about each respective axis z" and x" for each time it is detected that the telescope 9 has rotated about the individual axis by an increment of approximately 10 arc seconds. Also in a preferred embodiment of the invention, for each of these 10 arc second increments about individual ones of axes z" and x", the rate sensor/encoder block 3*b* provides information to the controller 1 representing the detected angular velocity of the telescope 9 about the individual axis z" x".

Figure 2A:
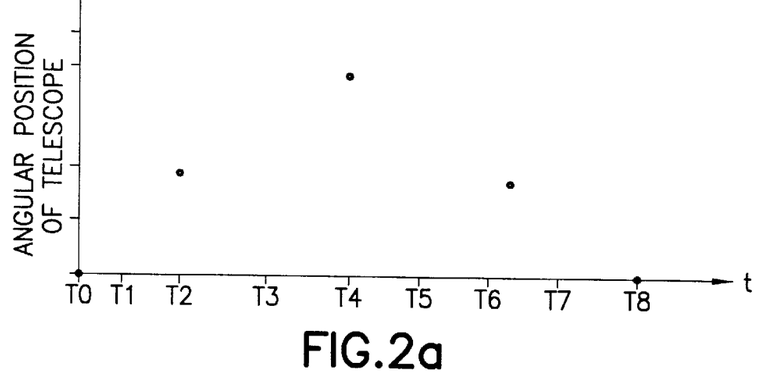
FIGS. 2a and 2b show a representation of exemplary angular position values and angular velocity values of the gimballed telescope of FIG. 1, as detected by respective position and rate sensor/encoder blocks of the SIARSCS of FIG. 1 over an exemplary time period.
Figure 2B:
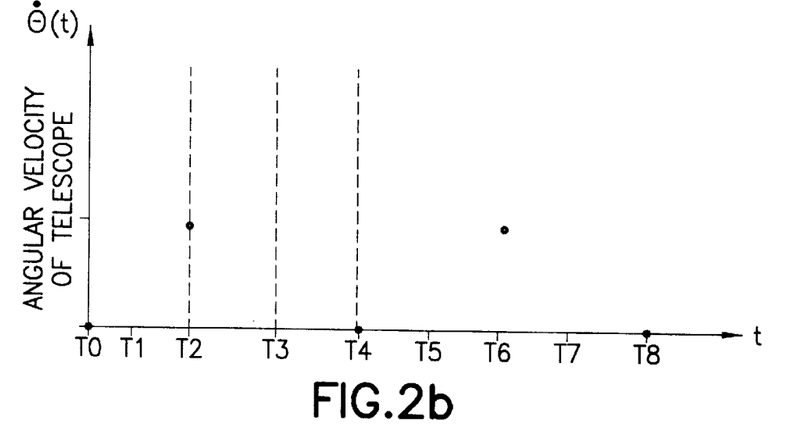
Figure 2C:
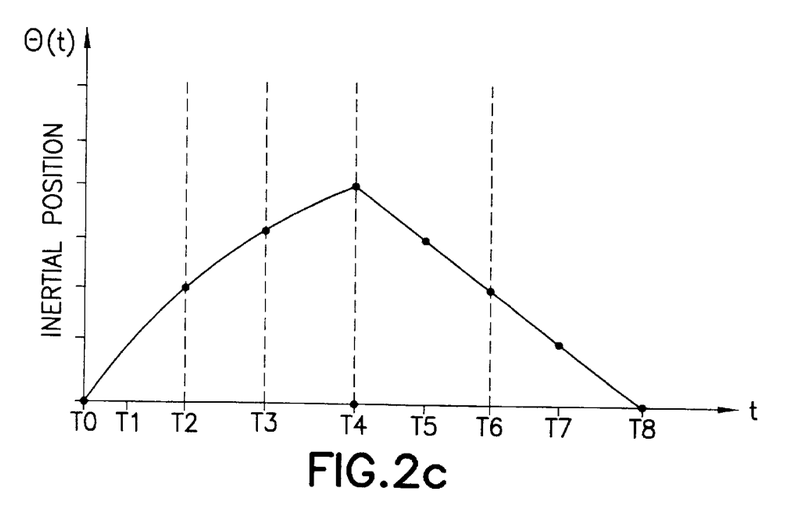

In accordance with the invention, the controller 1 performs an interpolation to estimate the position of the telescope 9 during times between those at which angular position detections are made by the block 3*a*. By example, FIG. 2*a* shows a representation of exemplary telescope angular position values, as detected by the block 3*a* at times T2, T4, and T6, and FIG. 2*b* shows a representation of exemplary angular velocity values of the telescope 9, as detected by the block 3*b* at times T2, T4, and T6. In accordance with this aspect of this invention, the controller 1 employs the values received from the blocks 3*a* and 3*b* to interpolate angular position values for the telescope 9 in between exemplary times T2, T4, and T6, using the following equation (EQ2):

$$\theta(T) = \theta(t) + \dot{\theta}(t)(T-t) \tag{EQ2}$$

where $\theta(T)$ represents the angular position of the telescope 9 at a selected time T, $\theta(t)$ represents the angular position of the telescope 9 at a particular previous time (t)(e.g., T2, T4, or T6), $\dot{\theta}(t)$ represents the angular velocity of the telescope 9 at this previous time (t), and (T−(t)) represents a temporal difference between the times T and (t). An example of telescope position values (also referred to as inertial position values) calculated by the controller 1 at selected times (T) of T3, T5, and T7 is shown in FIG. 2*c*, superimposed over the exemplary values of FIG. 2*a*. The interpolation performed by the controller 1 is also represented by block 7 of FIG. 8.

It should be noted that the times (T) may be determined in accordance with desired sampling rates (e.g., 1/50 seconds) of the control loop, which sampling rates may be selected based on the brightness of stellar body 22 and the size of telescope 9.

A further aspect of the invention will now be described. As was previously described, for cases in which it is necessary to correct the orientation of the telescope 9 and FOV relative to the star 22 as a result of undesired spacecraft motions, the SIARSCS 1' operates to maneuver the telescope 9 so as to maintain the telescope 9, LOS and FOV in a desired orientation relative to the star 22. By example, for the example described above the telescope 9 is maneuvered in an opposite direction than that of the spacecraft 10 motion, by an angular displacement that is substantially equal in magnitude to the total displacement of the spacecraft 10 about the individual axis z. Also in this example the telescope 9 is maneuvered about axis z" at a respective angular velocity that is substantially equal in magnitude to the angular velocity of the spacecraft 10 about individual axis z. This operation enables the telescope 9 (LOS, and FOV) to have an orientation relative to the star 22 such that the centroid of the distribution of star light energy 21 on the quad cell surface 16a is maintained at the line of sight reference point defined by the quad cell 16, even though the spacecraft 10 is in motion. Being that the telescope 9 is maneuvered by a similar angular displacement and velocity as those of spacecraft 10, but in an opposite direction, it can be appreciated that while the star light energy 21 is maintained at the line of sight reference point defined by the quad cell 16, the magnitude of the telescope's angular velocity detected by the block 3b represents the magnitude of the spacecraft's inertial angular velocity rate as well as that of the telescope 9, and the angular position of the telescope 9 (as detected by block 3a and interpolated in the controller 1) corresponds to the spacecraft inertial position. This being the case, it can also be appreciated that the attitude (position) of the spacecraft 10 may be determined and controlled based on the detected angular velocity and detected/interpolated angular position of the telescope 9. As such, and in accordance with this invention, the values of the telescope's angular velocity and angular position (including the interpolated values) about each axis x" and z" are output by the controller 1 to the spacecraft attitude determination and control system (SADACS) 8. The SADACS 8 employs these values to determine the attitude of the spacecraft 10 and to control the attitude adjustment actuators 11, if needed, so as to provide appropriate roll, pitch, and/or yaw torques for controlling the spacecraft attitude for maintaining the attitude of the spacecraft within pre-established deadband limits. It should be noted that for cases where the spacecraft attitude is controlled in this manner by the SADACS 8 and attitude adjustment actuators 11, the SIARSCS 1' operates in a closed-loop fashion, in a similar manner as was described above, for maintaining the orientation of the telescope 9 in its desired orientation relative to star 22.

As can be appreciated in view of the foregoing description, the SIARSCS 1' enables fine attitude control of the spacecraft 10 to be provided, without needing conventional elements, such as gyros or conventional stellar body trackers, which are typically employed in conventional spacecraft for generating spacecraft inertial rate and position information, respectively. As such, no gyros or conventional stellar body tracking equipment need be employed, and, as a result, the costs associated with these items can be avoided, although such items may be employed if desired to further enhance spacecraft attitude control.

Figure 6:
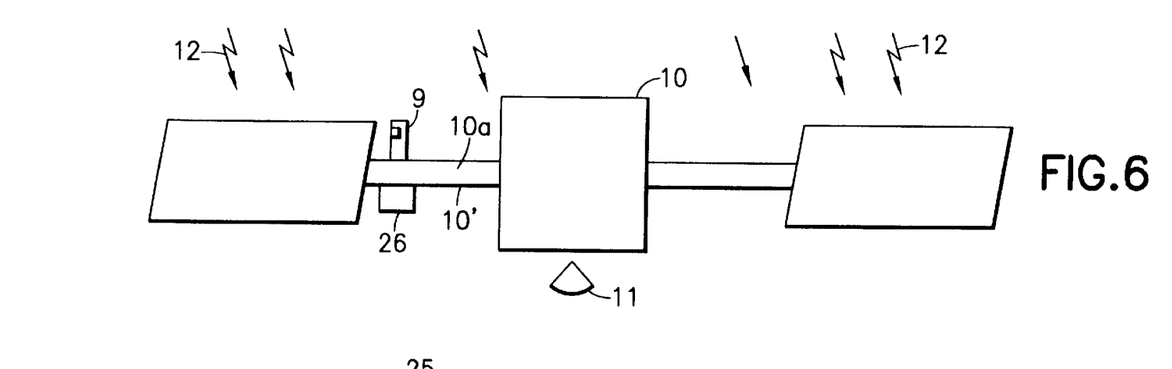
FIG. 6 depicts the spacecraft of FIGS. 3a–3c, the telescope of the spacecraft, and electronic components 26 of the SIARSCS of FIG. 1, wherein the structure of the spacecraft prevents solar radiation 12 impinging on the spacecraft from coming into contact with the electronic components 26, in accordance with an aspect of this invention.

In accordance with a further aspect of the invention, various, radiation-sensitive ones of the components of the SIARSCS 1' are mounted to the spacecraft 10 at a location which enables the components to be shielded from solar radiation 12 impinging on the spacecraft 10 by at least a portion of the spacecraft structure, so that the solar radiation 12 is prevented from coming into contact with these components. As an example, FIG. 6 shows the spacecraft 10 and the telescope 9, and also shows a block 26, which represents collective components 14, 15, 16, 1, 8, 3a, and 3b of the SIARSCS 1'. In accordance with the illustrated embodiment, the block 26 is mounted to a lower surface 10' of a portion 10a of the spacecraft 10. At least this portion 10a of the spacecraft 10 protects the block 26 by preventing the solar radiation 12 impinging in the spacecraft 10 from coming into contact with the block 26. As a result, the operation of the components 14, 15, 16, 1, 8, 3a, and 3b is not detrimentally affected by the solar radiation 12 impinging on the spacecraft 10, and the SIARSCS 1' can be considered to be "radiation hardened".

Figure 7:
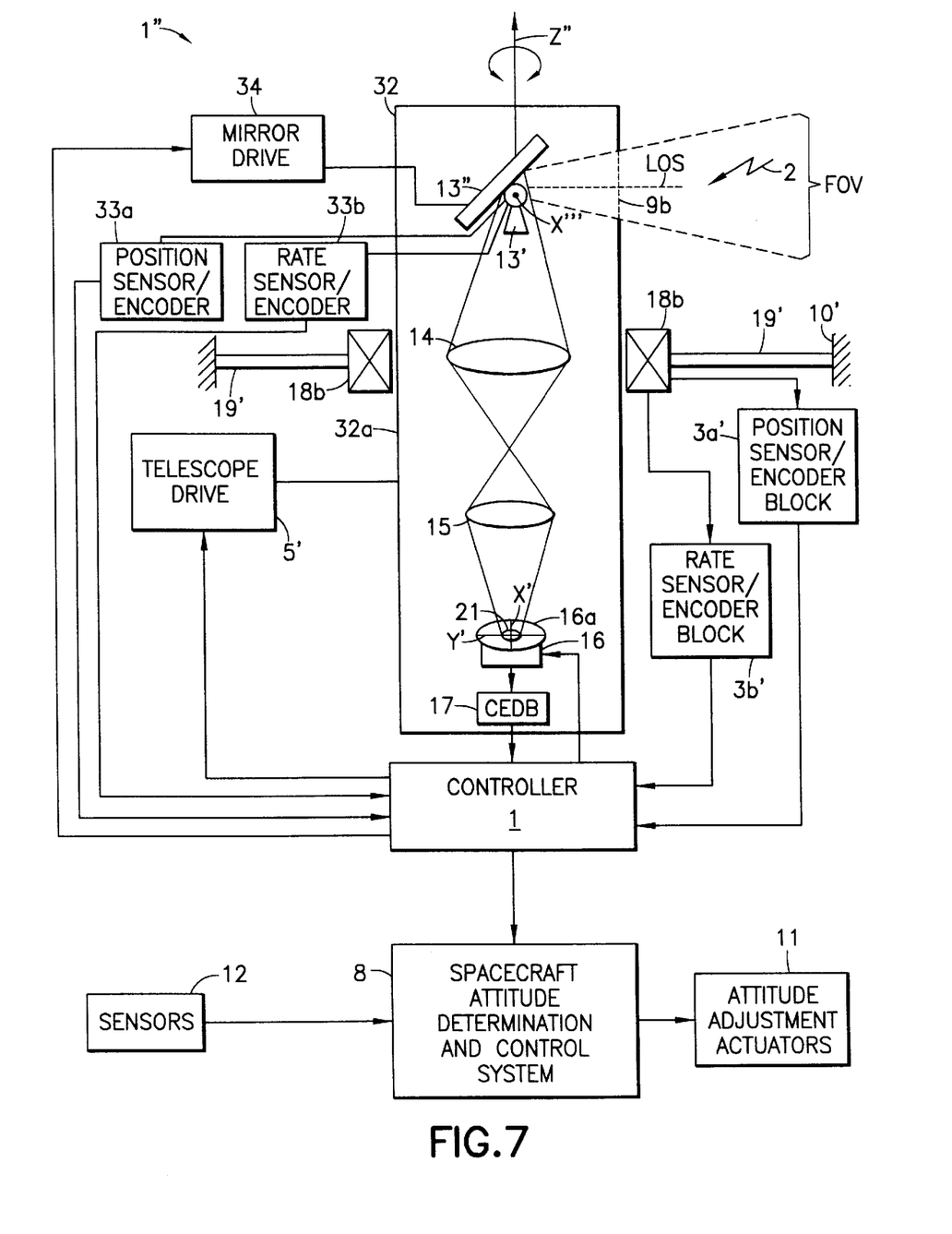
FIG. 7 depicts a Spacecraft Inertial Attitude and Rate Sensor Control System (SIARSCS) that is constructed in accordance with another embodiment of this invention.

It should be noted that the invention is not limited to employing a telescope such as the telescope 9 shown in FIG. 1 and described above. By example, and in accordance with an alternate embodiment of the invention, a SIARSCS 1" may be provided that includes similar components as the SIARSCS 1' of FIG. 1, except that the SIARSCS 1" includes a telescope 32 having a gimballed mirror 13", as shown in FIG. 7. The telescope 32 includes similar components as the telescope 9 described above, except that mirror 13" is supported by a gimbal support 13' (which is fixed to the telescope structure) which allows the mirror 13" to be rotated about an axis x'". Also, the SIARSCS 1" further comprises a mirror drive mechanism 34, a position sensor/encoder block 33a and a rate sensor/encoder block 33b.

Also in this embodiment, bearings 18b are disposed between a surface 32a of the telescope 32 and a structural portion 19' of a spacecraft 10', and provide gimbal supports for the telescope 32 for allowing the telescope 32 to be rotated about axis z". A telescope drive mechanism 5' is drivably-engaged with the surface 32a of the telescope 32, and is controllable by the controller 1 for being actuated to provide selected torques to the telescope 32 for causing the telescope 32 to rotate about the axis z" by a selected angular displacement relative to the spacecraft structure 19', preferably without affecting the attitude of the spacecraft 10.

The mirror drive mechanism 34 is drivably engaged with the mirror 13", and is controllable by the controller 1 for exerting a torque which causes the mirror 13" to rotate about axis x'" by a corresponding angular displacement, without affecting the attitude of the telescope 32. Preferably, the telescope drive mechanism 34 and gimbal support 13' have a collective capability for enabling the mirror 13" to be rotated about the axis x'" by at least ±4 degrees.

The position sensor/encoder block 33a detects the angular position (i.e., the arc of rotation) of the mirror 13" relative to axis x'", and translates the detected angular position to corresponding information which is provided to the controller 1. The rate sensor/encoder block 33b detects the angular velocity at which the mirror 13" rotates about the axis x'", and translates the detected angular velocity to corresponding information which is also provided to the controller 1.

Also, a position sensor/encoder block 3a' detects the angular position (i.e., the arc of rotation) of the telescope 32 relative to the axis z", and translates the detected angular position to corresponding information which is provided to the controller 1. A rate sensor/encoder block 3b' detects the angular velocity at which the telescope 32 rotates about the axis z", and translates the detected angular velocity to corresponding information which is also provided to the controller 1.

In accordance with this embodiment of the invention, the SIARSCS 1' operates in a similar manner as was described above, except that in appropriate cases where it is necessary to compensate for a rotation of the spacecraft 10' about axis x, the mirror 13", instead of the telescope 32, is controlled for being rotated about the axis x'" by a selected angular displacement. Also, outputs of the blocks 33*a* and 33*b*, in addition to those of the blocks 3*a*' and 3*b*', are employed for enabling spacecraft inertial rate and position information to be determined, for subsequent use in controlling the attitude of spacecraft 10'. That is, spacecraft inertial rate and position information is derived based on information representing the detected position of the telescope 32, information representing the detected rate at which the telescope 32 is maneuvered, information representing the detected position of the mirror 13", and information representing the detected rate at which the mirror 13" is maneuvered.

Having described a number of embodiments of the invention, some of the advantages provided by the SIARSCS 1', 1" of the invention will now be described. By example, and as was previously described, one advantage of the SIARSCS 1', 1" is that it is less expensive than conventional spacecraft attitude control systems that employ gyros and conventional stellar body trackers. Another advantage is that the SIARSCS 1', 1" is a thermally stable system, and the telescopes 9 and 32 each provide a high degree of detection accuracy as compared to conventional telescopes having comparably-sized apertures. Moreover, and as was also previously described, the SIARSCS 1', 1" enables both satellite-related inertial position and inertial rate information to be generated, and thus does not require the use of conventional stellar body trackers and gyros for generating this information. Furthermore, being that the field of view (FOV) of the telescopes 9 and 32 is preferably about ±0.5 degrees, a quad cell detector 16 may be employed which has a smaller area than radiation detectors employed in conventional telescopes.

It should be noted that any suitable type of drive mechanism may be employed for the telescope drive 5, including, by example, an electro-mechanical or inertial drive mechanism.

In the preferred embodiment of the invention, the telescope 9 comprises a mirror 13, a primary lens 14, a secondary lens 15, a quad cell detector (also referred to as a quad cell) 16, and a centroid error detection block (CEDB) 17, which operates in a manner as will be described below. Wavelengths 2 (such as those emitted by a stellar body within the field of view (FOV) of telescope 9) received by the telescope 9 through an aperture 9*b* of the telescope 9 are reflected from the mirror 13 to the primary lens 14, which then focusses the wavelengths it receives to the secondary lens 15. Those ones of the wavelengths that are reflected to the secondary lens 15 are focussed by the secondary lens 15 to a radiation sensitive surface 16*a*

As was previously described, it should be noted that although the invention is described above in the context of employing only the blocks 3*a*, 3*b* (or 33*a* and 33*b*) to generate inertial position and rate information, gyros and/or stellar body trackers may also be employed in conjunction with the blocks 3*a* and 3*b* (or 33*a* and 33*b*) to provide such information. Also, in one embodiment, gyros may be employed for generating the inertial rate information, and the SIARSCS 1', 1" may be employed to provide this information in cases wherein one or more of the gyros fail(s) to operate effectively.

While the invention has been particularly shown and described with respect to preferred embodiments thereof, it will be understood by those skilled in the art that changes in form and details may be made therein without departing from the scope and spirit of the invention. By example, it should be noted that it is within the scope of this invention for the computations performed within the CEDB 17 to be performed within the controller 1. Also, other forms of equations that those described above may be employed for the star tracking procedure.

What is claimed is:

1. In a satellite having a star tracking system, said tracking system including an optical sensor mounted on the satellite for relative movement thereon, a light sensitive panel mounted to receive light from the light sensor and convert said light to an electrical signal, a processor for determining the position of the light signal on the panel, and a drive to move the optical sensor, a method of controlling the optical sensor comprising the steps of:

aligning said optical sensor with a star that provides a spatial reference for the satellite;

focusing light from said star on the light sensitive panel at a predetermined panel reference location;

sensing the position of the focused light on said panel over a period of time;

comparing said reference location with the position of said focused light;

generating an error signal representing the displacement of said focused light from said reference location;

actuating said drive in response to said error signal to move said optical sensor relative to the satellite to return the focused light to the reference location; and sensing the position and rate of movement of the optical sensor relative to the satellite and processing said sensed data to derive the inertial rate and position of the satellite.

2. In a satellite having a star tracking system, said tracking system including an optical sensor mounted on the satellite for relative movement thereon, a light sensitive panel mounted to receive light from the light sensor and convert said light to an electrical signal, a processor for determining the position of the light signal on the panel, and a drive to move the optical sensor, a method of controlling the optical sensor, as described in claim 1, wherein the step of actuating said drive occurs only when said displacement is equal to or greater than a predetermined minimum threshold.

3. In a satellite having a star tracking system, said tracking system including an optical sensor mounted on the satellite for relative movement thereon, a light sensitive panel mounted to receive light from the light sensor and convert said light to an electrical signal, a processor for determining the position of the light signal on the panel, and a drive to move the optical sensor, a method of controlling the optical sensor, as described in claim 1, further comprising the step of adjusting the attitude of the satellite in response to said derived inertial rate and position of the satellite.

4. In a satellite having a star tracking system, said tracking system including an optical sensor mounted on the satellite for relative movement thereon, a light sensitive panel mounted to receive light from the light sensor and convert said light to an electrical signal, a processor for determining the position of the light signal on the panel, and a drive to move the optical sensor, a method of controlling the optical sensor, as described in claim 1, wherein said steps are performed continuously in response to changes in attitude of the satellite.

5. In a satellite having a star tracking system, said tracking system including an optical sensor mounted on the satellite for relative movement thereon, a light sensitive panel mounted to receive light from the light sensor and convert said light to an electrical signal, a processor for determining the position of the light signal on the panel, and a drive to move the optical sensor, a method of controlling the optical sensor, as described in claim 1, wherein said drive is actuated to move the optical sensor at an angular rate substantially equal to the angular rate of the movement of the satellite.

6. In a satellite having a star tracking system, said tracking system including an optical sensor mounted on the satellite for relative movement thereon, a light sensitive panel mounted to receive light from the light sensor and convert said light to an electrical signal, a processor for determining the position of the light signal on the panel, and a drive to move the optical sensor, a method of controlling the optical sensor, as described in claim 1, further including the step of mounting the optical sensor on the satellite in a position such that a portion of the satellite shields the optical sensor from solar radiation.

7. A star tracking system for an orbiting satellite comprising:
- an optical sensor mounted on the satellite for relative movement thereon, said optical sensor being aligned with a star that provides a spatial reference for the satellite, and focusing light from said star on a light sensitive panel, said optical sensor further including a drive to move said sensor relative to said satellite;
- a light sensitive panel mounted to receive light from the light sensor and convert said light to an electrical signal, said panel having a predetermined reference location;
- a first processor for determining the position of the light on the panel, calculating the displacement of said position from said predetermined reference location, and generating an error signal representing said displacement;
- a second processor for actuating said drive in response to said error signal to move said optical sensor relative to the satellite to return the focused light to the reference location; and wherein said second processor further senses the position and rate of movement of the optical sensor relative to the satellite and processes said sensed data to derive the inertial rate and position of the satellite.

8. A star tracking system for an orbiting satellite, as described in claim 7, wherein said drive is actuated only when said displacement is equal to or greater than a predetermined minimum threshold.

9. A star tracking system for an orbiting satellite, as described in claim 7, wherein said second processor further adjusts the attitude of the satellite in response to said derived inertial rate and position of the satellite.

10. A star tracking system for an orbiting satellite, as described in claim 7, wherein said star tracking system operates continuously in response to changes in attitude of the satellite.

11. A star tracking system for an orbiting satellite, as described in claim 7, wherein said drive is actuated to move the optical sensor at an angular rate substantially equal to the angular rate of the movement of the satellite.

12. A star tracking system for an orbiting satellite, as described in claim 7, wherein said optical sensor is mounted on the satellite in a position such that a portion of the satellite shields the optical sensor from solar radiation.

* * * * *